United States Patent
Nanda et al.

(10) Patent No.: US 10,732,840 B2
(45) Date of Patent: Aug. 4, 2020

(54) EFFICIENT SPACE ACCOUNTING MECHANISMS FOR TRACKING UNSHARED PAGES BETWEEN A SNAPSHOT VOLUME AND ITS PARENT VOLUME

(71) Applicant: EMC IP Holding Company LLC, Hopkinton, MA (US)

(72) Inventors: Kumari Bijayalaxmi Nanda, Edison, NJ (US); Alexander S. Mathews, Morganville, NJ (US); Soumyadeep Sen, Highland Park, NJ (US); Michal Marko, Fanwood, NJ (US)

(73) Assignee: EMC IP Holding Company LLC, Hopkinton, MA (US)

(*) Notice: Subject to any disclaimer, the term of this patent is extended or adjusted under 35 U.S.C. 154(b) by 9 days.

(21) Appl. No.: 16/176,482

(22) Filed: Oct. 31, 2018

(65) Prior Publication Data

US 2020/0133491 A1 Apr. 30, 2020

(51) Int. Cl.
*G06F 3/06* (2006.01)
*G06F 12/00* (2006.01)

(52) U.S. Cl.
CPC .......... *G06F 3/0604* (2013.01); *G06F 3/0653* (2013.01); *G06F 3/0673* (2013.01)

(58) Field of Classification Search
CPC .... G06F 3/0604; G06F 3/0653; G06F 3/0873; G06F 12/00; G06F 13/00
USPC .................................. 711/100, 154
See application file for complete search history.

(56) References Cited

U.S. PATENT DOCUMENTS

| | | | |
|---|---|---|---|
| 8,027,984 B2 | 9/2011 | Passey et al. | |
| 8,700,578 B1 | 4/2014 | Varadan et al. | |
| 8,996,490 B1 | 3/2015 | Armangau et al. | |
| 9,760,574 B1 | 9/2017 | Zhai et al. | |
| 9,846,544 B1 | 12/2017 | Bassov | |
| 9,904,480 B1 | 2/2018 | Singh et al. | |
| 9,916,102 B1 | 3/2018 | Bassov et al. | |
| 9,940,331 B1 | 4/2018 | Bono et al. | |
| 9,959,054 B1 | 5/2018 | Vankamamidi et al. | |
| 10,061,697 B2 | 8/2018 | Danilov et al. | |
| 10,073,969 B1 | 9/2018 | Faibish et al. | |
| 2011/0320707 A1* | 12/2011 | Usami | G06F 3/061 711/114 |

(Continued)

*Primary Examiner* — Tuan V Thai
(74) *Attorney, Agent, or Firm* — BainwoodHuang

(57) ABSTRACT

Techniques for tracking pages that are unshared among snapshot volumes and their parent volume in a volume family. The techniques include maintaining a first counter that tracks a first number ("SnapOwnedCount") of pages among a total number of pages written to a volume that were overwritten in the immediate sequential next volume in the same branch as the volume, and a second counter that tracks a second number ("UnsharedWithParentCount") of pages among the total number of pages written to the volume that were overwritten in any sequential next volume in the same branch as the volume. By maintaining, for each volume in a volume family, a first counter and a second counter for tracking the SnapOwnedCount and the UnsharedWithParentCount, respectively, data storage recovery can be performed more effectively, allowing selected volumes and/or portions thereof to be deleted while maintaining accurate space accounting information.

20 Claims, 6 Drawing Sheets

(56) References Cited

U.S. PATENT DOCUMENTS

| | | | |
|---|---|---|---|
| 2014/0208048 A1* | 7/2014 | Deguchi | G06F 11/2064 711/162 |
| 2015/0046668 A1* | 2/2015 | Hyde, II | G06F 3/065 711/162 |
| 2017/0315878 A1* | 11/2017 | Purohit | G06F 11/1458 |

* cited by examiner

EFFICIENT SPACE ACCOUNTING MECHANISMS FOR TRACKING UNSHARED PAGES BETWEEN A SNAPSHOT VOLUME AND ITS PARENT VOLUME

BACKGROUND

Data storage systems include storage processors coupled to arrays of non-volatile storage devices, such as magnetic disk drives, electronic flash drives, and/or optical drives. The storage processors are configured to service storage input/output (IO) requests received from host computers, which send the storage IO requests to the data storage systems over one or more networks. The storage IO requests specify data pages, data files, data blocks, and/or other data elements to be written to, read from, created on, and/or deleted from volumes, file systems, and/or other storage objects stored on the respective non-volatile storage devices. Computer software application programs running on the storage processors are configured to manage the received storage IO requests, and to perform various data processing tasks to organize and/or secure the data elements and/or storage objects on the non-volatile storage devices.

At certain points in time, data storage systems create snapshot volumes for purposes of providing for data recovery, backing-up data volumes, improving computer software application program availability, reducing data management costs, and/or other purposes. The snapshot volumes can record states of the data storage systems by creating point-in-time (PIT) copies of data volumes, which are organized with associated metadata in a logical address space. The data volumes can include extents of storage space within the logical address space, and extents belonging to respective data volumes can include data pages of the same size or different sizes.

SUMMARY

A data storage system can create a snapshot volume of a data volume (also referred to herein as a "parent volume") by allocating a new index node (also referred to herein as an "inode") for the snapshot volume, and copying attributes of the parent volume's inode to the new inode of the snapshot volume. The copied attributes can include pointers to an indirect page tree associated with the parent volume, which points to pages storing data of the parent volume. The creation of a snapshot volume can therefore involve allocating new metadata, e.g., a new inode, for the snapshot volume, without allocating any new data pages for the snapshot volume. Rather, all of the data pages of the parent volume can initially be shared with its corresponding snapshot volume.

As time passes, however, storage IO requests received at the data storage system from one or more host computers can result in one or more new data pages being allocated to the parent volume, and/or one or more existing data pages of the parent volume being deleted or overwritten. Further, the parent volume's Mode can be updated to point to one or more newly allocated data pages, while the Mode of the snapshot volume can remain unchanged. At least one data page of the parent volume previously shared with its corresponding snapshot volume can therefore become unique or unshared with the snapshot volume. The data storage system can also create a sequence of additional snapshot volumes of the parent volume, in which one or more data pages of the additional snapshot volumes are shared or unshared with the parent volume and/or one or more of the other snapshot volumes in the sequence.

From time to time, a user or administrator of a data storage system may wish to delete or purge selected snapshot volumes and/or selected data pages of snapshot volumes to release or recover storage space within the data storage system. Performing accurate space accounting in the presence of such deletion or purging of snapshot volumes and/or data pages thereof can be problematic, however, due to the potential sharing of data pages among one or more snapshot volumes and/or their parent volume(s). For example, if an initial snapshot volume in a sequence of snapshot volumes shares at least one data page with a subsequent volume in the sequence, then deleting the initial snapshot volume (or a data page(s) thereof) may result in the deletion of at least one of the shared data pages.

Techniques are disclosed herein for performing efficient snapshot space accounting in a data storage system, which allow for tracking of data pages that are unshared among one or more snapshot volumes and their parent volume(s) in a volume family. The volume family can include at least one branch, and each branch can include one or more snapshot volumes that are sequential copies of a parent volume. The disclosed techniques can include maintaining two (2) counters for each data volume in each branch of the volume family, namely, (i) a first counter that can track a first number of data pages among a total number of data pages written to the data volume that were overwritten in the immediate sequential next volume in the same branch as the data volume, and (ii) a second counter that can track a second number of data pages among the total number of data pages written to the data volume that were overwritten in any sequential next volume in the same branch as the data volume. The first number (also referred to herein as the "SnapOwnedCount") tracked by the first counter can provide an indication of the number of data pages owned by a snapshot volume. Such a snapshot volume is deemed to be an "owner" of a data page if the snapshot volume is the data volume for which the data page changed. The second number (also referred to herein as the "UnsharedWithParentCount") tracked by the second counter can provide an indication of the number of data pages of a snapshot volume that are unshared with a parent volume of the snapshot volume.

By maintaining, for each data volume in a volume family, a first counter and a second counter for tracking the SnapOwnedCount and the UnsharedWithParentCount, respectively, data storage recovery and/or other similar activities in a data storage system can be performed more effectively, allowing, for example, selected snapshot volumes and/or portions thereof to be deleted or purged while maintaining accurate space accounting information. The disclosed techniques can foster better storage management by knowing which data volume logically owns how many data pages (i.e., the SnapOwnedCount), as well as how many logical data pages (i.e., the UnsharedWithParentCount) are needed for a data volume and its parent if they are to be retained or moved as a unit.

In certain embodiments, a method of a data storage system for tracking data pages that are unshared among one or more data volumes and their parent volume in a volume family includes (i) for at least one data volume among at least one sequence of data volumes in at least one branch of a volume family, counting a first number of data pages among a total number of data pages written to the data volume that were overwritten in an immediate sequential next volume in the same branch as the data volume, the first number of data pages corresponding to a number of data pages owned by the data volume, and (ii) for the at least one data volume among the at least one sequence of data volumes in the at least one branch of the volume family, counting a second number of data pages among the total number of data pages written to the data volume that were overwritten in any sequential next volume in the same branch as the data volume, the second number of data pages corresponding to a number of data pages of the data volume that are unshared with a parent volume of the data volume.

In certain arrangements, the method further includes, based on one or more of the first number of data pages and the second number of data pages relative to the total number of data pages written to the data volume, deleting the data volume from the data storage system, while maintaining accurate space accounting information.

In certain arrangements, the volume family has an associated family identifier (ID), each branch of the volume family has an associated branch ID, each branch root volume in the volume family has an associated branch root volume ID, and each data volume in the volume family has an associated volume ID. The family ID, the branch ID, the branch root volume ID, and the volume ID for each data volume in the volume family are referred to herein collectively as an "IO key." In addition, a first branch of the volume family includes a writable volume. The method further includes receiving a first write request at the data storage system, the first write request requesting that a first data page be written to the writable volume in the first branch of the volume family, incorporating the IO key associated with the writable volume into the first write request, and forwarding the first write request along a write path to effect writing of the first data page to the writable volume.

In certain arrangements, the method further includes maintaining the family ID, the branch ID, the branch root volume ID, and the volume ID for each data volume in the volume family in a namespace index node (inode) of the data storage system.

In certain arrangements, the method further includes maintaining a mapping hierarchy of the sequence of data volumes in the volume family, the mapping hierarchy including at least a volume level with a plurality of volume nodes corresponding to the sequence of data volumes, respectively, and a leaf level with a plurality of leaf nodes corresponding to a plurality of leaf pages, respectively, each leaf page pointing to a data page of a respective one of the sequence of data volumes.

In certain arrangements, each leaf page has an attribute specifying an owner volume ID of an owner of the data page pointed to by the leaf page. The method further includes, having written the first data page to the writable volume, setting an owner volume ID in a leaf page of the mapping hierarchy pointing to the first data page to a current latest volume ID of the writable volume.

In certain arrangements, the method further includes creating a snapshot volume in the first branch of the volume family based on the writable volume, assigning the current latest volume ID to the snapshot volume, and assigning a new latest volume ID to the writable volume.

In certain arrangements, the method further includes, having created the snapshot volume in the first branch of the volume family, setting the owner volume ID in the leaf page of the mapping hierarchy pointing to the first data page to the new latest volume ID of the writable volume.

In certain arrangements, the method further includes receiving a second write request at the data storage system, the second write request requesting that the first data page written to the writable volume be overwritten with new data, incorporating the IO key associated with the writable volume into the second write request, and forwarding the second write request along the write path to effect overwriting of the first data page with the new data.

In certain arrangements, the method further includes, having overwritten the first data page with the new data, setting an owner volume ID in a leaf page of the mapping hierarchy pointing to an overwritten version of the first data page to the new latest volume ID of the writable volume, and maintaining the current latest volume ID of the snapshot volume in the leaf page of the mapping hierarchy pointing to an original version of the first data page.

In certain arrangements, the method further includes, for the writable volume, incrementing a count of the first number of data pages corresponding to the number of data pages owned by the writable volume.

In certain arrangements, the method further includes, for the snapshot volume, incrementing a count of the first number of data pages corresponding to the number of data pages owned by the snapshot volume, and incrementing a count of the second number of data pages corresponding to the number of data pages of the snapshot volume that are unshared with the writable volume.

In certain arrangements, the method further includes maintaining, for each of the writable volume and the snapshot volume, the count of the first number of data pages and the count of the second number of data pages in a key-value store.

In certain arrangements, the maintaining of the count of the first number of data pages and the count of the second number of data pages in the key-value store includes maintaining a key-value pair in the key-value store for each of the writable volume and the snapshot volume. The key-value pair for the writable volume includes a first key corresponding to the family ID, the branch ID, and the volume ID for the writable volume, and a first value corresponding to the count of the first number of data pages and the count of the second number of data pages for the writable volume. The key-value pair for the snapshot volume includes a second key corresponding to the family ID, the branch ID, and the volume ID for the snapshot volume, and a second value corresponding to the count of the first number of data pages and the count of the second number of data pages for the snapshot volume.

In certain embodiments, a data storage system includes at least one storage device configured to store at least one sequence of data volumes, a memory configured to store executable instructions, and storage processing circuitry configured to execute the executable instructions out of the memory (i) for at least one data volume among the at least one sequence of data volumes in at least one branch of a volume family, to count a first number of data pages among a total number of data pages written to the data volume that were overwritten in an immediate sequential next volume in the same branch as the data volume, the first number of data pages corresponding to a number of data pages owned by the data volume, and (ii) for the at least one data volume among the at least one sequence of data volumes in the at least one branch of the volume family, to count a second number of data pages among the total number of data pages written to the data volume that were overwritten in any sequential next volume in the same branch as the data volume, the second number of data pages corresponding to a number of data pages of the data volume that are unshared with a parent volume of the data volume.

In certain arrangements, the storage processing circuitry is further configured to execute the executable instructions out of the memory, based on one or more of the first number of data pages and the second number of data pages relative to the total number of data pages written to the data volume, to delete the data volume from the at least one storage device, while maintaining accurate space accounting information.

Other functions and aspects of the claimed features of this disclosure will be evident from the Detailed Description that follows.

BRIEF DESCRIPTION OF THE DRAWINGS

The foregoing and other objects, features, and advantages will be apparent from the following description of particular embodiments of this disclosure, as illustrated in the accompanying drawings, in which like reference characters refer to the same parts throughout the different views.

FIG. 5b is a block diagram of a detailed view of the key-value store of FIG. 5a.

DETAILED DESCRIPTION

Techniques are disclosed herein for performing efficient snapshot space accounting in a data storage system, which allow for tracking of data pages that are unshared among one or more snapshot volumes and their parent volume(s) in a volume family. The disclosed techniques can include maintaining two (2) counters for each data volume in each branch of the volume family, namely, (i) a first counter that can track a first number (also referred to herein as the "SnapOwnedCount") of data pages among a total number of data pages written to the data volume that were overwritten in the immediate sequential next volume in the same branch as the data volume, and (ii) a second counter that can track a second number (also referred to herein as the "UnsharedWithParentCount") of data pages among the total number of data pages written to the data volume that were overwritten in any sequential next volume in the same branch as the data volume. By maintaining, for each data volume in a volume family, a first counter and a second counter for tracking the SnapOwnedCount and the UnsharedWithParentCount, respectively, data storage recovery and/or other similar activities in a data storage system can be performed more effectively, allowing, for example, selected snapshot volumes and/or portions thereof to be deleted or purged while maintaining accurate space accounting information.

Figure 1:
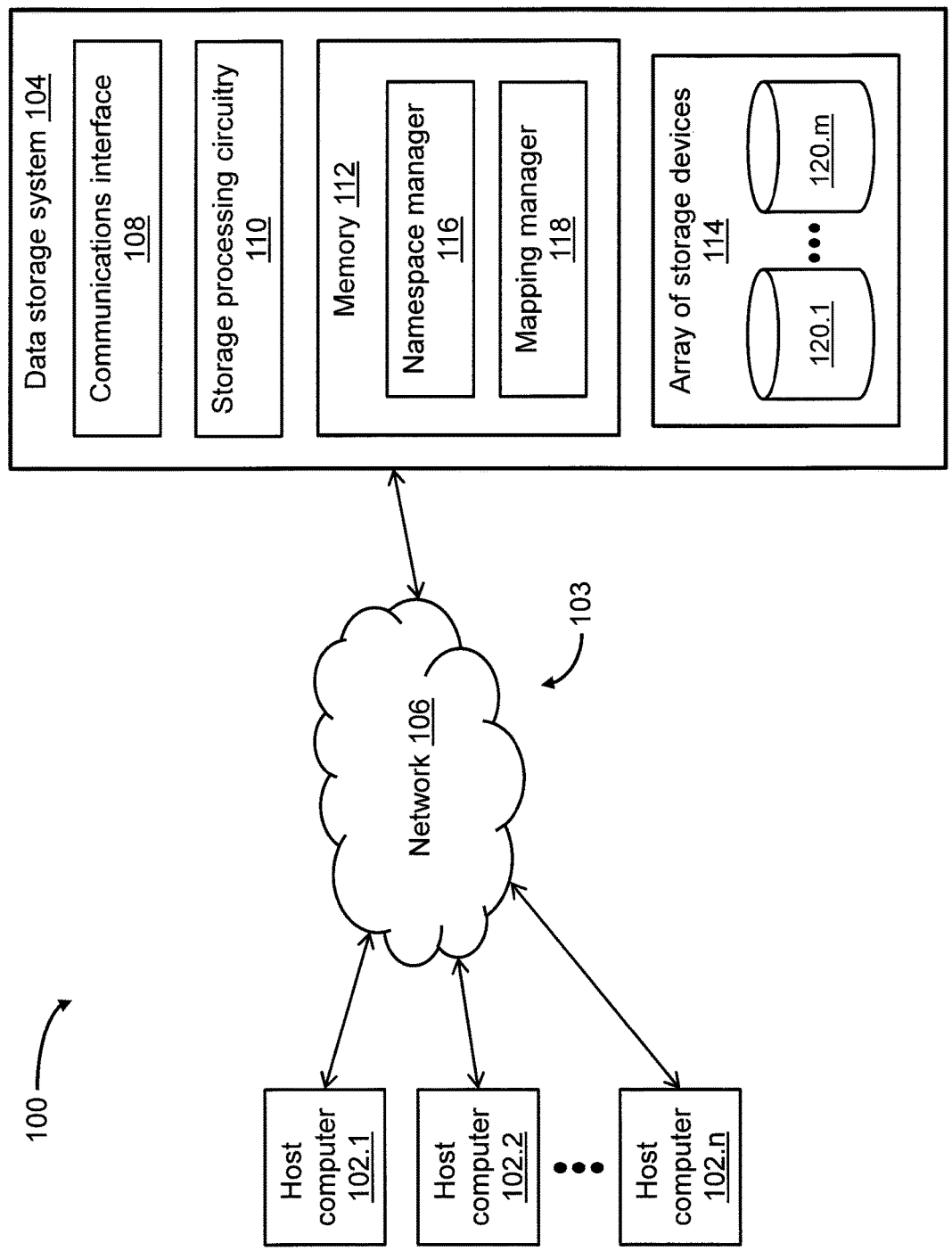
FIG. 1 is a block diagram of an exemplary computer system environment, in which techniques can be practiced for tracking data pages that are unshared among one or more snapshot volumes and their parent volume(s) in a volume family.

FIG. 1 depicts an illustrative embodiment of an exemplary computer system environment 100, in which techniques can be practiced for tracking data pages that are unshared among one or more snapshot volumes and their parent volume(s) in a volume family. As shown in FIG. 1, the computer system environment 100 can include a plurality of host computers 102.1, 102.2, . . . , 102.n communicably coupled to a data storage system 104 by a communications medium 103, which can include at least one network 106. For example, each of the plurality of host computers 102.1, . . . , 102.n may be configured as a web server computer, a file server computer, an email server computer, an enterprise server computer, and/or any other suitable client or server computer or computerized device configured to provide storage input/output (IO) requests (e.g., small computer system interface (SCSI) commands, network file system (NFS) commands) to the data storage system 104 over the communications medium 103. Such storage IO requests provided by the plurality of host computers 102.1, . . . , 102.n can direct the data storage system 104 to store (e.g., write) or retrieve (e.g., read) data pages, data files, data blocks, and/or any other suitable data elements to or from volumes, file systems, and/or any other suitable storage objects on behalf of the respective host computers 102.1, . . . , 102.n.

The communications medium 103 can be configured to interconnect the plurality of host computers 102.1, . . . , 102.n and the data storage system 104 to enable them to communicate and exchange data signals. As shown in FIG. 1, the communications medium 103 is illustrated as a "cloud" to represent a variety of different communications topologies, including, but not limited to, a backbone topology, a hub and spoke topology, a loop topology, an irregular topology, or any suitable combination thereof. As such, the communications medium 103 can include, but is not limited to, copper-based data communications devices and cabling, fiber optic devices and cabling, wireless devices, or any suitable combination thereof. Further, the communications medium 103 can be configured to support storage area network (SAN)-based communications, network attached storage (NAS)-based communications, local area network (LAN)-based communications, metropolitan area network (MAN)-based communications, wide area network (WAN)-based communications, wireless communications, distributed infrastructure communications, and/or any other suitable wired, wireless, or fiber communications.

As further shown in FIG. 1, the data storage system 104 can include a communications interface 108, storage processing circuitry 110, a memory 112, and an array of storage devices 114. The communications interface 108 can include SCSI target adapters, network interface adapters, and/or any other suitable adapters for converting electronic, wireless, and/or optical signals received over the network 106 to a form suitable for use by the storage processing circuitry 110. The memory 112 can include persistent memory (e.g., flash memory, magnetic memory) and non-persistent cache memory (e.g., dynamic random access memory (DRAM), static random access memory (SRAM)), and can accommodate a variety of specialized software constructs, including, but not limited to, namespace management code and data (also referred to herein as the "namespace manager"; see reference numeral 116) and mapping management code and data (also referred to herein as the "mapping manager"; see reference numeral 118).

The namespace manager 116 can be configured to maintain a namespace of storage objects, such as volumes (e.g., virtual volumes (VVOLs), logical storage units (LUNs)), file systems, and/or any other suitable storage objects, accessible to the plurality of host computers 102.1, . . . , 102.n. In general, a namespace is a point-in-time (PIT) logical collection of such storage objects, each of which can be represented by an index node (also referred to herein as an "inode"). In one embodiment, the namespace maintained by the namespace manager 116 can include a set of storage objects (e.g., VVOLs) organized as a collection of inodes. For example, each such VVOL may be made up of one or more extents, each of which may correspond to a range of storage sizes (e.g., 1 megabyte (Mb), 4 Mbs) in a logical address space. Further, the range of storage sizes may correspond to a range of contiguous or noncontiguous logical addresses spanning some or all of the VVOL.

The mapping manager 118 can be configured to map extents of volumes (e.g., VVOLs, LUNs) to corresponding redundant array of independent disk (RAID) addresses, which, in turn, can be mapped to corresponding drive locations in the array of storage devices 114. The array of storage devices 114 can include a plurality of storage drives 120.1, . . . 120.m, such as magnetic disk drives, electronic flash drives, and/or any other suitable storage drives. The storage processing circuitry 110 can include one or more physical storage processors or engines, data movers, director boards, blades, IO modules, storage drive controllers, switches, and/or any other suitable computer hardware or combination thereof. In one embodiment, the storage processing circuitry 110 can process storage IO requests provided by the respective host computers 102.1, . . . , 102.n over the communications medium 103, and store host data in a RAID environment implemented by the array of storage devices 114.

In the context of the storage processing circuitry 110 being implemented using one or more processors running specialized software, a computer program product can be configured to deliver all or a portion of the software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein. For example, such media may be considered to be articles of manufacture, and may be transportable from one data storage appliance to another data storage appliance.

During operation, the data storage system 104 (see FIG. 1) can perform efficient snapshot space accounting, which allows for tracking of data pages that are unshared among one or more snapshot volumes and their parent volume(s) in a volume family. Such a volume family can include at least one branch, and each branch can include one or more snapshot volumes that are sequential copies of a parent volume. Such tracking of unshared data pages can include maintaining two (2) counters for each data volume in each branch of the volume family, namely, (i) a first counter that can track a first number of data pages among a total number of data pages written to the data volume that were overwritten in the immediate sequential next volume in the same branch as the data volume, and (ii) a second counter that can track a second number of data pages among the total number of data pages written to the data volume that were overwritten in any sequential next volume in the same branch as the data volume. The first number (the "SnapOwnedCount") tracked by the first counter can provide an indication of the number of data pages owned by a snapshot volume. Such a snapshot volume is deemed to be an "owner" of a data page if the snapshot volume is the data volume for which the data page changed. The second number (the "UnsharedWithParentCount") tracked by the second counter can provide an indication of the number of data pages of a snapshot volume that are unshared with a parent volume of the snapshot volume. By maintaining, for each data volume in a volume family, a first counter and a second counter for tracking the SnapOwnedCount and the UnsharedWithParentCount, respectively, data storage recovery and/or other similar activities in the data storage system 104 can be performed more effectively, allowing, for example, selected snapshot volumes and/or selected data pages thereof to be deleted or purged while maintaining accurate space accounting information.

Figure 2:
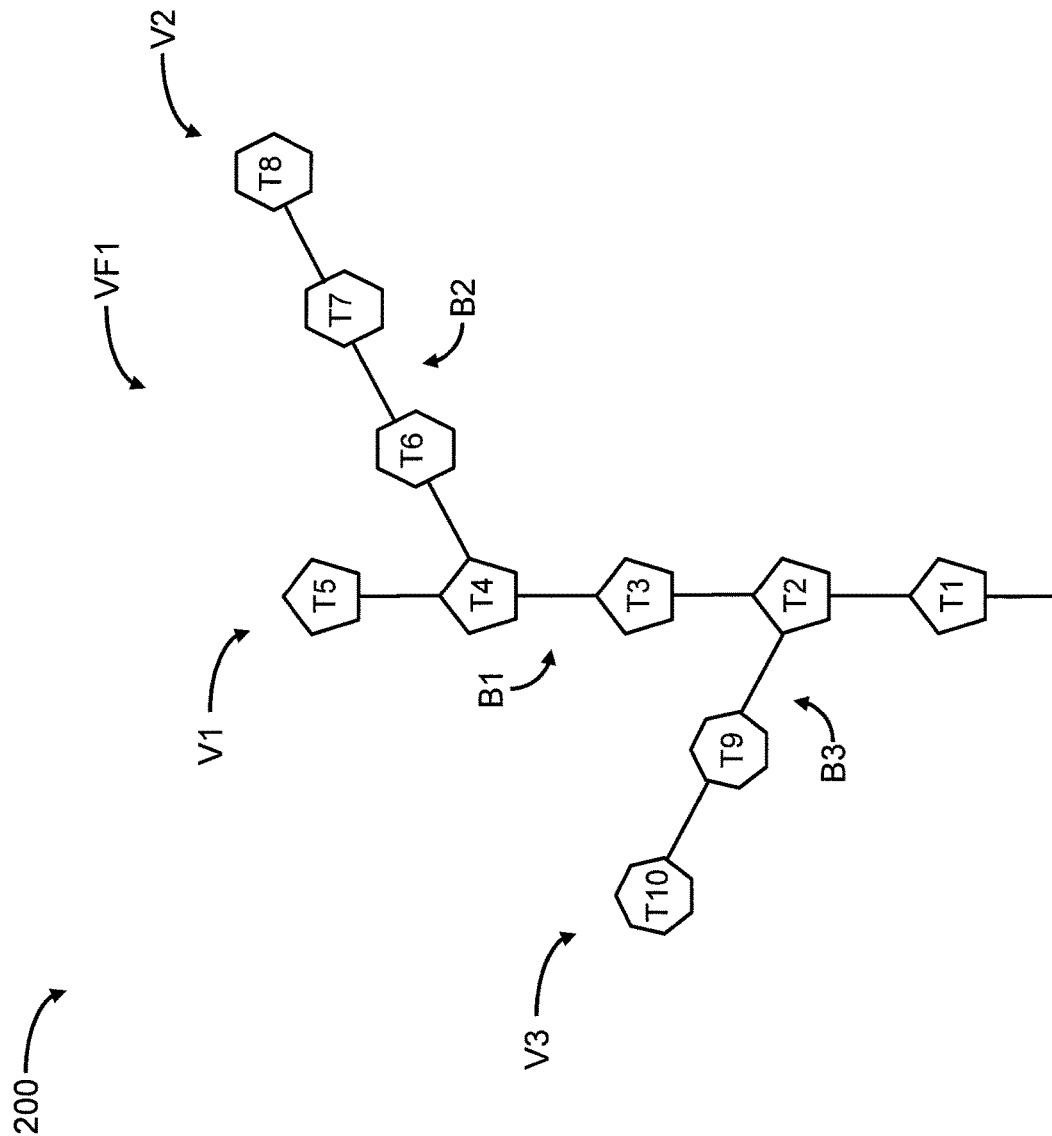
FIG. 2 is a block diagram of an exemplary volume family including a plurality of branches, each of which includes a sequence of data volumes.

FIG. 2 depicts an acyclic graph 200 representing an exemplary volume family VF1. The volume family VF1 includes a plurality of branches B1, B2, B3, each of which includes one or more read-only snapshot volumes that are sequential copies of a writable parent volume. As shown in FIG. 2, the branch B1 includes a plurality of snapshot volumes T1, T2, T3, T4, which are sequential point-in-time (PIT) copies of a parent volume T5 (also referred to herein as the "primary volume"). The branch B2 includes a plurality of snapshot volumes T6, T7, which are sequential PIT copies of a parent volume T8 (also referred to herein as a "clone volume"). The branch B3 includes a single snapshot volume T9, which is a PIT copy of a parent volume T10 (also referred to herein as a "clone volume"). It is noted that the volumes T1, T2, T3, T4, T5 in the branch B1 may each correspond to a version of a volume V1, the volumes T6, T7, T8 in the branch B2 may each correspond to a version of a volume V2, and the volumes T9, T10 in the branch B3 may each correspond to a version of a volume V3.

In general, an acyclic graph representing a volume family (such as the acyclic graph 200 representing the volume family VF1; see FIG. 2) can be constructed by assigning a volume identifier (ID) to a newly created primary volume, and, over time, assigning monotonically increasing volume IDs to the primary volume and one or more sequential snapshot copies of the primary volume to form a first branch of the volume family (as illustrated in FIG. 2 by the monotonically increasing tag designations T1, T2, T3, T4 of the four (4) snapshot volumes and T5 of the single primary volume in the branch B1 of the volume family VF1). It is noted that the writable primary volume (e.g., the primary volume T5; see FIG. 2) is assigned the latest volume ID in the first branch (e.g., the branch B1; see FIG. 2) of the volume family (e.g., the volume family VF1; see FIG. 2). In other words, if a snapshot volume is created based on a primary volume of a volume family, then the snapshot volume is assigned the current latest volume ID in a first branch of the volume family, while the primary volume is assigned a new latest volume ID in the first branch of the volume family.

Having obtained at least part of the first branch of the volume family, a writable clone volume can be created based on a selected snapshot volume in the first branch. With reference to the acyclic graph 200 representing the volume family VF1 (see FIG. 2), it is understood that an initial version of the clone volume T8 in the branch B2 was created based on the snapshot volume T4 in the branch B1. Similarly, an initial version of the clone volume T10 in the branch B3 was created based on the snapshot volume T2 in the branch B1. Like the primary volume (e.g., the primary volume T5; see FIG. 2) in the first branch of the volume family described hereinabove, each clone volume (e.g., the clone volume T8 or T10; see FIG. 2) is assigned the latest volume ID in a new branch (e.g., the branch B2 or B3; see FIG. 2) of the volume family. In other words, if a snapshot volume is created based on a clone volume in a new branch of a volume family, then the snapshot volume is assigned the current latest volume ID in the new branch of the volume family, while the clone volume is assigned a new latest volume ID in the new branch of the volume family.

It is noted that the first branch and subsequent new branches of a volume family are assigned monotonically increasing branch IDs (as illustrated in FIG. 2 by the monotonically increasing tag designations B1, B2, B3 of the three (3) branches in the volume family VF1). Further, each branch of a volume family has a corresponding branch root volume. With reference to the volume family VF1 (see FIG. 2), the branch B1 has a corresponding branch root volume T1 (i.e., the snapshot volume T1; see FIG. 2), the branch B2 has a corresponding branch root volume T4 (i.e., the snapshot volume T4; see FIG. 2), and the branch B3 has a corresponding branch root volume T2 (i.e., the snapshot volume T2; see FIG. 2).

To facilitate the tracking of data pages that are unshared among one or more snapshot volumes and their parent volume(s) in a volume family, the data storage system 104 can assign, to each data volume in a volume family, (i) a corresponding volume family ID ("Family ID"), (ii) a corresponding branch ID ("Branch ID"), (iii) a corresponding branch root volume ID ("Branch root volume ID"), and (iv) a corresponding volume ID ("Volume ID"). In one embodiment, the namespace manager 116 (see FIG. 1) can be configured to maintain a Family ID, a Branch ID, a Branch root volume ID, and a Volume ID for each data volume in a volume family stored in the data storage system 104. As described herein, the namespace maintained by the namespace manager 116 can include a set of storage objects (e.g., VVOLs) organized as a collection of Modes. Such a collection of Modes can be organized with associated namespace metadata, including a namespace Mode that can be configured to store information regarding the collection of Modes (including the Family ID, the Branch ID, the Branch root volume ID, and the Volume ID for each data volume in a volume family) in an Mode file.

Figure 3:
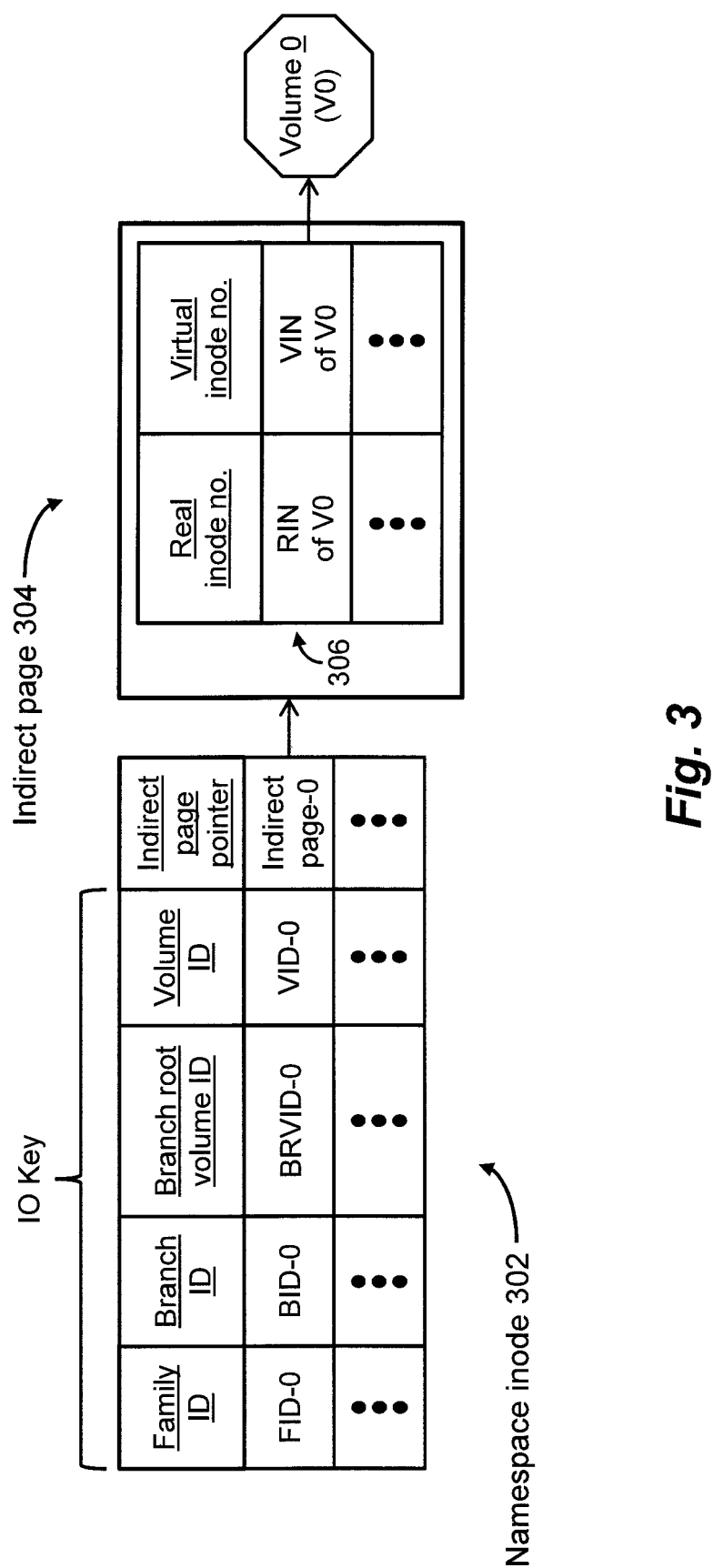
FIG. 3 is a block diagram of an exemplary namespace index node (inode) configured to include a volume family identifier (ID), a branch ID, a branch root volume ID, and a volume ID for each data page of a data volume in a volume family.

FIG. 3 depicts an exemplary namespace Mode 302 that can be maintained by the namespace manager 116 of the data storage system 104. As shown in FIG. 3, the namespace Mode 302 can be configured to store a Family ID, a Branch ID, a Branch root volume ID, and a Volume ID (also referred to herein collectively as an "IO key") for one or more data volumes stored in the data storage system 104. For example, for an exemplary data volume "V0" ("Volume 0") in a volume family, the namespace Mode 302 may store an IO key that includes a Family ID, "FID-0," a Branch ID, "BID-0," a Branch root volume ID, "BRVID-T0," and a Volume ID, "VID-0." The namespace Mode 302 may also store an indirect page pointer ("Indirect page pointer"), "Indirect page-0," which points to an indirect page 304. The indirect page 304 can be configured to store information pertaining to the set of volumes included in the namespace maintained by the namespace manager 116. For example, the stored information may include an entry 306 that stores information pertaining to the Volume 0, including a real Mode number ("RIN") for the Volume 0, as well as a virtual Mode number ("VIN") for the Volume 0. It is noted that, while the storage processing circuitry 110 services a write request from one of the host computers 102.1, . . . , 102.*n* for writing a data page "0" to the Volume 0, the namespace manager 116 can incorporate the appropriate IO key (e.g., FID-0, BID-0, BRVID-T0, VID-0) for the Volume 0 into the write request before it is forwarded along a write path to the mapping manager 118.

To further facilitate the tracking of data pages that are unshared among one or more snapshot volumes and their parent volume(s) in a volume family, the data storage system 104 (see FIG. 1) can maintain an owner volume ID for each data page of a data volume stored in the data storage system 104. As employed herein, the owner volume ID provides, for each data page, an indication of the data volume to which the data page was last written. In one embodiment, for each data page, the owner volume ID can be stored in a corresponding leaf page at a leaf level of a mapping hierarchy, which can be maintained by the mapping manager 118.

Figure 4:
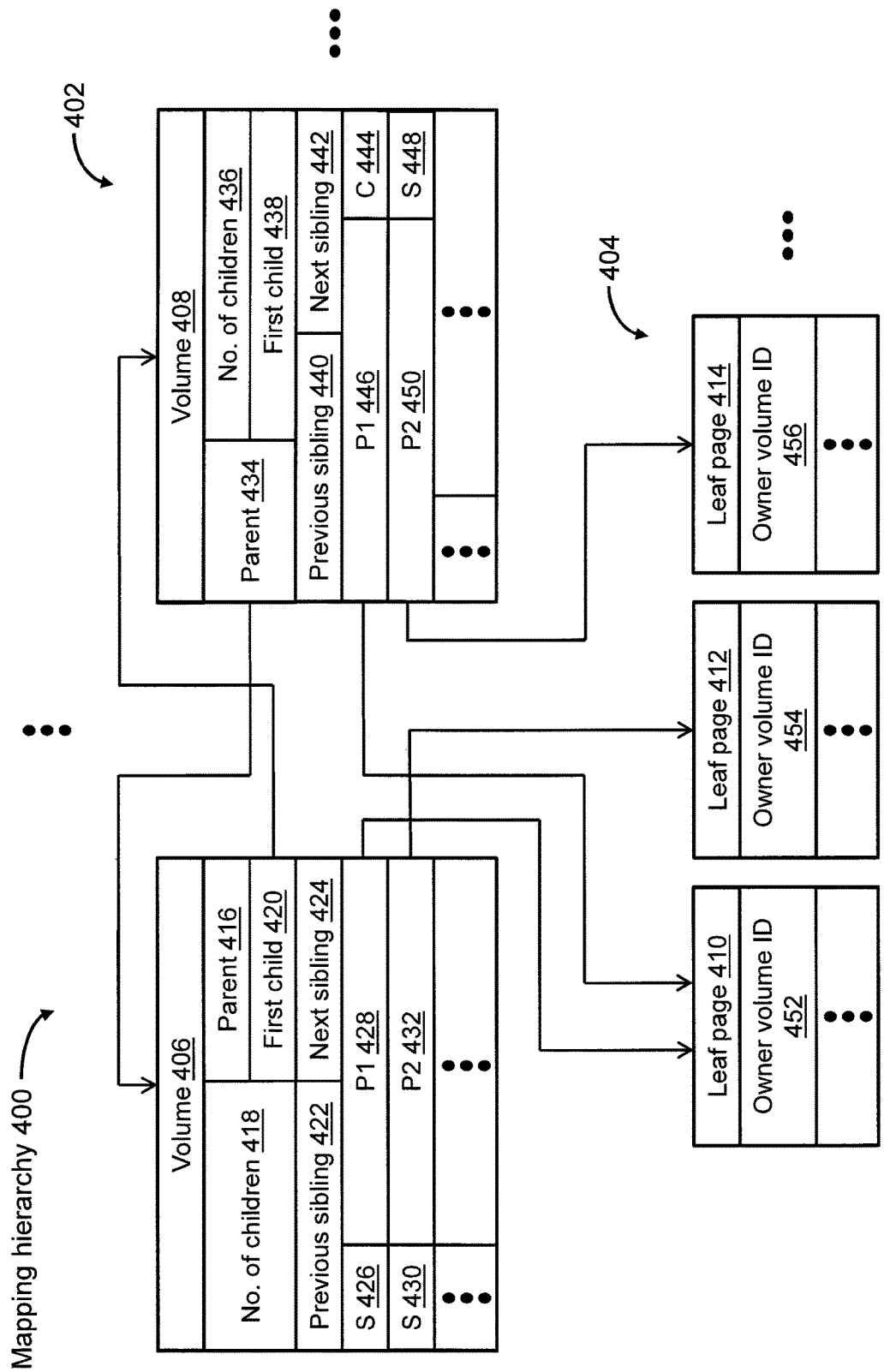
FIG. 4 is a block diagram of an exemplary mapping hierarchy for a plurality of exemplary data volumes in a volume family.

FIG. 4 depicts an exemplary mapping hierarchy 400 for a plurality of data volumes (such as a volume 406 and a volume 408) in a volume family. As shown in FIG. 4, the mapping hierarchy 400 can be configured as a multi-level tree (e.g., a B+ tree) that includes at least a volume level 402 and a leaf level 404. The volume level 402 can have nodes corresponding to at least the volume 406 and the volume 408, and the leaf level 404 can have nodes corresponding to at least a leaf page 410, a leaf page 412, and a leaf page 414. It is noted, however, that the multi-level tree of the mapping hierarchy 400 can include many more levels than the two levels 402, 404. For example, the multi-level tree may include a multitude of volume levels above the volume level 402.

As shown in FIG. 4, the node corresponding to the volume 406 can include multiple attributes corresponding to a parent 416, a number of children 418, a first child 420, a previous sibling 422, and a next sibling 424. Likewise, the node corresponding to the volume 408 can include multiple attributes corresponding to a parent 434, a number of children 436, a first child 438, a previous sibling 440, and a next sibling 442. The parent attributes 416, 434 correspond to pointers to locations of parent volumes of the respective volumes 406, 408, if any. For example, the parent attribute 434 of the volume 408 may point to a location of the volume 406, which may be the parent volume of the volume 408. The number of children attributes 418, 436 provide indications of the number of child volumes of the respective volumes 406, 408, if any. The first child attributes 420, 438 correspond to pointers to locations of first child volumes of the respective volumes 406, 408, if any. For example, the first child attribute 420 of the volume 406 may point to a location of the volume 408, which may be the first child volume (e.g., snapshot volume) of the volume 406. It is noted that, once the first child volumes of the volumes 406, 408 are located, additional child volumes of the respective volumes 406, 408 may be located by following associated previous and/or next sibling pointers. The previous sibling attributes 422, 440 correspond to pointers to locations of previous sibling volumes for child volumes of the respective volumes 406, 408, if any. The next sibling attributes 424, 442 correspond to pointers to locations of next sibling volumes for child volumes of the respective volumes 406, 408, if any. As described herein, the owner volume ID for each data page of a data volume can be stored in a corresponding leaf page (such as the leaf page 410, 412, or 414; see FIG. 4) at the leaf level 404 of the mapping hierarchy 400. Accordingly, the leaf page 410 can include an attribute corresponding to an owner volume ID 452. Likewise, the leaf page 412 can include an attribute corresponding to an owner volume ID 454, and the leaf page 414 can include an attribute corresponding to an owner volume ID 456.

As further shown in FIG. 4, the node corresponding to the volume 406 can further include leaf pointers (such as a leaf pointer P1 428 and a leaf pointer P2 432) to locations of the leaf page 410, the leaf page 412, and/or the leaf page 414. For example, the leaf pointer P1 428 may point to a location of the leaf page 410, and the leaf pointer P2 432 may point to a location of the leaf page 412. Likewise, the node corresponding to the volume 408 can further include leaf pointers (such as a leaf pointer P1 446 and a leaf pointer P2 450) to locations of the leaf page 410, the leaf page 412, and/or the leaf page 414. For example, the leaf pointer P1 446 may point to a location of the leaf page 410, and the leaf pointer P2 450 may point to a location of the leaf page 414. In addition, each of the leaf pointer P1 428, the leaf pointer P2 432, the leaf pointer P1 446, and the leaf pointer P2 450 can include a source ("S") attribute or a copy ("C") attribute. For example, the leaf pointer P1 428 may include a source (S) attribute 426, which indicates that the volume 406 is the source of a data page corresponding to the leaf page 410; and, the leaf pointer P2 432 may include a source (S) attribute 430, which indicates that the volume 406 is the source of a data page corresponding to the leaf page 412. Further, the leaf pointer P1 446 may include a copy (C) attribute 444, which indicates that the volume 406 shares a copy of the data page corresponding to the leaf page 410 with the volume 408; and, the leaf pointer P2 450 may include a source (S) attribute 448, which indicates that the volume 408 is the source of a data page corresponding to the leaf page 414. It is noted that each of the leaf pages 410, 412, and 414 can further include page pointers (not shown) to their respective corresponding data pages.

As described herein, the tracking of unshared data pages among one or more snapshot volumes and their parent volume(s) in a volume family can include maintaining two (2) counters for each data volume in each branch of the volume family, i.e., (i) the first counter that can track the first number (the "SnapOwnedCount") of data pages among a total number of data pages written to the data volume that were overwritten in the immediate sequential next volume in the same branch as the data volume, and (ii) the second counter that can track the second number (the "UnsharedWithParentCount") of data pages among the total number of data pages written to the data volume that were overwritten in any sequential next volume in the same branch as the data volume. In one embodiment, the mapping manager 118 can maintain, for each data volume in the volume family, both the SnapOwnedCount and the UnsharedWithParentCount in a key-value store 504, as illustrated in FIGS. 5a and 5b.

Figure 5A:
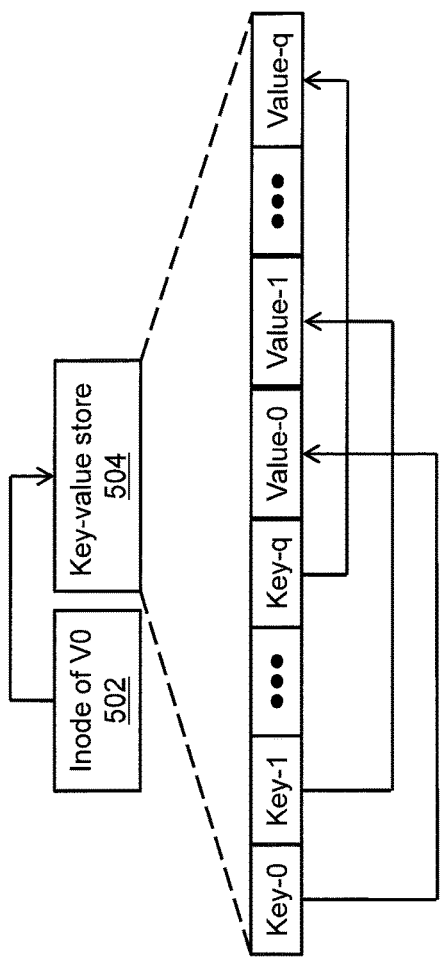
FIG. 5a is a block diagram of an inode of an exemplary data volume in a volume family, in which the inode is configured to point to an exemplary key-value store for storing a volume family ID, a branch ID, a branch root volume ID, and a volume ID for an exemplary data page of the data volume.
Figure 5B:
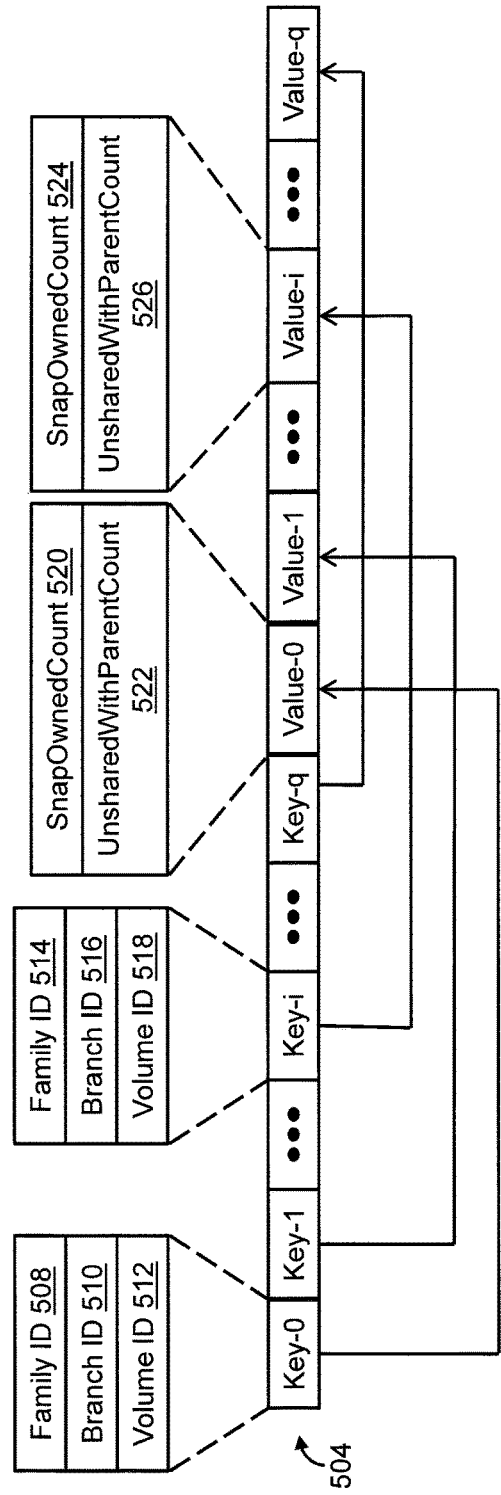

As shown in FIG. 5a, for an exemplary data page 0 of a data volume V0 in a volume family, an Mode 502 of the data volume V0 can include a pointer to the key-value store 504. Further, as shown in FIGS. 5a and 5b, the key-value store 504 can include a plurality of keys 0, 1, . . . , i, . . . , q that point to or are otherwise paired with a plurality of values 0, 1, . . . , i, . . . , q, respectively. In one embodiment, the "key" in a key-value pair can be implemented by a Family ID, a Branch ID, and a Volume ID of a data volume, while the "value" in the key-value pair can include both the SnapOwnedCount and the UnsharedWithParentCount of the data volume. For example, the key-0 (see FIG. 5b) of a $0^{th}$ key-value pair may be implemented by a Family ID 508, a Branch ID 510, and a Volume ID 512 of the data volume V0, while the value-0 (see also FIG. 5b) of the $0^{th}$ key-value pair may include a SnapOwnedCount 520 and an UnsharedWithParentCount 522 of the data volume V0. Likewise, the key-i (see FIG. 5b) of an $i^{th}$ key-value pair may be implemented by a Family ID 514, a Branch ID 516, and a Volume ID 518 of a data volume Vi (not shown), while the value-i (see also FIG. 5b) of the $i^{th}$ key-value pair may include a SnapOwnedCount 524 and an UnsharedWithParentCount 526 of the data volume Vi (not shown). It is noted that the key-value store 504 can include key-value pairs for multiple data volumes V0, . . . , Vi, . . . , Vq from one or more volume families.

The disclosed techniques for performing efficient snapshot space accounting in a data storage system, which allow for tracking of data pages that are unshared among one or more snapshot volumes and their parent volume(s) in a volume family, will be further understood with reference to the following illustrative example, as well as the volume family VF1 illustrated in FIG. 2. In this example, it is assumed that the volume family VF1 (see FIG. 2) is created and stored in the data storage system 104 (see FIG. 1), and that the volume T1 included in the branch B1 of the volume family VF1 is initially the only volume in the volume family VF1. As such, the volume T1 is initially deemed to be the (writable) primary volume in the volume family VF1. It is further assumed that (i) the IO key for the primary volume T1 is made up of a Family ID, "FID-1," a Branch ID, "BID-1," a Branch root volume ID, "BRVID-T1," and a Volume ID, "VID-1," and (ii) the SnapOwnedCount and the UnsharedWithParentCount for the primary volume T1 are each initially set to "0."

At a first point in time, a first write request is received at the data storage system 104, requesting that a data page "1" be written to the (writable) primary volume T4. Having received the first write request at the data storage system 104, the namespace manager 116 incorporates the IO key for the primary volume T1 into the first write request, and forwards the first write request along the write path to the mapping manager 118 to effect writing of the data page 1 to the primary volume T4. Because, at this first point in time, the primary volume T1 is the data volume to which the data page 1 was last written (i.e., the primary volume T1 is the owner of the data page 1), the owner volume ID stored in the leaf page of the mapping hierarchy for the data page 1 is set to the Volume ID of the primary volume T1, namely, VID-1.

At a second point in time, the data storage system 104 creates a (read-only) snapshot volume based on the primary volume T1. Once the snapshot volume is created, the namespace manager 116 assigns the current latest volume ID, namely, VID-1, to the snapshot volume, and assigns a new latest volume ID, namely, VID-2, to the primary volume T1. Further, for purposes of consistency in numbering, the tag designation for the primary volume is changed from "T1" to "T2," and the tag designation assigned to the snapshot volume is "T1." At this second point in time, the snapshot volume T1 and the primary volume T2 are the only volumes included in the branch B1 of the volume family VF1 (see FIG. 2). In other words, the branch B1 of the volume family VF1 now includes the snapshot volume T1, and the immediate sequential next volume in the branch B1, namely, the primary volume T2. Because the primary volume T2 is the data volume to which the data page 1 was last written (i.e., the primary volume T2 is the owner of the data page 1), the owner volume ID stored in the leaf page of the mapping hierarchy for the data page 1 is set to the Volume ID of the primary volume T2, namely, VID-2. Further, the node of the mapping hierarchy corresponding to the primary volume T2 includes a pointer to the location of the leaf page for the data page 1 that includes a source "S" attribute, and the node of the mapping hierarchy corresponding to the snapshot volume T1 includes a pointer to the location of the leaf page for the data page 1 that includes a copy "C" attribute. In addition, the SnapOwnedCount and the UnsharedWithParentCount for the primary volume T2 each remain set to "0," while the SnapOwnedCount and the UnsharedWithParentCount for the snapshot volume T1 are each initially set to "0."

At a third point in time, a second write request is received at the data storage system 104, requesting that the data page 1 on the (writable) primary volume T2 be overwritten with new data. Having received the second write request at the data storage system 104, the namespace manager 116 incorporates the IO key for the primary volume T2 (i.e., FID-1, BID-1, BRVID-T1, VID-2) into the second write request, and forwards the second write request along the write path to the mapping manager 118 to effect overwriting of the data page 1 on the primary volume T2. Because the data page 1 of the primary volume T2 has been overwritten while the data page 1 of the snapshot volume T1 has not been changed, the data page 1 is now unique or unshared between the primary volume T2 and the snapshot volume T4. As such, the node corresponding to the primary volume T2 includes a pointer to the location of the leaf page for the overwritten version of data page 1 that includes a source "S" attribute, and the node corresponding to the snapshot volume T1 includes a pointer to the location of the leaf page for the unchanged version of data page 1 that likewise includes a source "S" attribute.

Because the primary volume T2 is the data volume to which the overwritten version of data page 1 was last written (i.e., the primary volume T2 is the owner of the overwritten version of data page 1), the owner volume ID stored in the leaf page of the mapping hierarchy for the overwritten version of data page 1 is set to the Volume ID of the primary volume T2, namely, VID-2. Further, because the snapshot volume T1 is the data volume to which the unchanged version of data page 1 was last written (i.e., the snapshot volume T1 is the owner of the unchanged version of data page 1), the owner volume ID stored in the leaf page of the mapping hierarchy for the unchanged version of data page 1 is set to the Volume ID of the snapshot volume T1, namely, VID-1. In addition, the SnapOwnedCount for the primary volume T2 is set to "1," and the UnsharedWithParentCount for the primary volume T2 remains set to "0." Likewise, the SnapOwnedCount for the snapshot volume T1 is set to "1." However, because the number of data pages of the snapshot volume T1 that are unshared with all of the sequential next volume(s) in the branch B1 (i.e., the primary volume T2) is now equal to 1, the UnsharedWithParentCount for the snapshot volume T1 is set to "1."

At subsequent points in time, the data storage system 104 may create one or more additional (read-only) snapshot volumes based on the (writable) primary volume in the branch B1, and/or one or more additional write requests, requesting that a data page(s) on the primary volume in the branch B1 be overwritten with new data, may be received at the data storage system 104. As a result, one or more owner volume IDs stored in leaf pages of the mapping hierarchy, as well as one or more SnapOwnedCounts and/or UnsharedWithParentCounts for the respective data volumes, may be further updated in the manner described herein. For example, if the branch B1 of the volume family VF1 ultimately includes the four (4) (read-only) snapshot volumes T1, T2, T3, T4 and the (writable) primary volume T5 (as illustrated in FIG. 2), then the SnapOwnedCount for each of at least some of the snapshot volumes T1, T2, T3, T4 may be updated to track the number of data pages among a total number of data pages written to the respective snapshot volumes T1, T2, T3, and/or T4 that were overwritten in the immediate sequential next volume in the branch B1. Further, the UnsharedWithParentCount for each of at least some of the snapshot volumes T1, T2, T3, T4 may be updated to track the number of data pages among the total number of data pages written to the respective snapshot volumes T1, T2, T3, and/or T4 that were overwritten in any sequential next volume in the branch B1.

Accordingly, the SnapOwnedCount and the UnsharedWithParentCount for each of the snapshot volumes T1, T2, T3, T4 (see FIG. 2) may be updated, as follows:

i) Snapshot volume T1:
  (a) SnapOwnedCount may be updated to equal the number of data pages overwritten in the immediate sequential next volume T2; and
  (b) UnsharedWithParentCount may be updated to equal the sum of (i) the number of data pages overwritten in the immediate sequential next volume T2, (ii) the number of data pages overwritten in the sequential next volume T3, (iii) the number of data pages overwritten in the sequential next volume T4, and (iv) the number of data pages overwritten in the sequential next volume T5.

ii) Snapshot volume T2:
  (a) SnapOwnedCount may be updated to equal the number of data pages overwritten in the immediate sequential next volume T3; and
  (b) UnsharedWithParentCount may be updated to equal the sum of (i) the number of data pages overwritten in the immediate sequential next volume T3, (ii) the number of data pages overwritten in the sequential next volume T4, and (iii) the number of data pages overwritten in the sequential next volume T5.

iii) Snapshot volume T3:
  (a) SnapOwnedCount may be updated to equal the number of data pages overwritten in the immediate sequential next volume T4; and
  (b) UnsharedWithParentCount may be updated to equal the sum of (i) the number of data pages overwritten in the immediate sequential next volume T4, and (ii) the number of data pages overwritten in the sequential next volume T5.

iv) Snapshot volume T4:
  (a) SnapOwnedCount may be updated to equal the number of data pages overwritten in the immediate sequential next volume T5; and
  (b) UnsharedWithParentCount may be updated to equal the number of data pages overwritten in the immediate sequential next volume T5.

It is noted that such owner volume IDs, SnapOwnedCounts, and/or UnsharedWithParentCounts may be updated in a similar manner for the (read-only) snapshot volumes T6, T7 and the (writable) clone volume T8 included in the branch B2 of the volume family VF1, as well as the (read-only) snapshot volume T9 and the (writable) clone volume T10 included in the branch B3 of the volume family.

From time to time, a user or administrator of the data storage system 104 may wish to delete or purge a selected snapshot volume to release or recover storage space within the data storage system 104. In such a case, for each data page of the selected snapshot volume that is shared among one or more sequential next volumes in the same branch as the selected snapshot volume, it may be necessary to update the attribute corresponding to the owner volume ID in the leaf page of the data page, if the snapshot volume selected for deletion is deemed to be the current owner of the data page. In one embodiment, once the selected snapshot volume is deleted, the storage processing circuitry 110 can query the owner volume ID attribute of the leaf page of the shared data page to determine whether the deleted snapshot volume was indeed the current owner of the data page. If it is determined that the deleted snapshot volume was not the current owner of the data page, then no further action is taken. Otherwise, if it is determined that the deleted snapshot volume was the current owner of the data page, then the storage processing circuitry 110 can (i) identify, in the same branch as the deleted snapshot volume, a sequential next volume that previously shared the data page with the deleted snapshot volume, and (ii) update the owner volume ID attribute in the leaf page of the shared data page to reflect the volume ID of the identified sequential next volume, which is now the effective owner of the data page. In one embodiment, to facilitate queries of owner volume ID attributes of leaf pages, the mapping hierarchy of data volumes of a volume family (e.g., the mapping hierarchy 400; see FIG. 4) can be configured as a B+ tree. It is noted that the deletion of snapshot volumes can be performed as a background process. It is further noted that, once the selected snapshot volume is deleted, the key-value pair for the deleted snapshot volume in the key-value store (e.g., the key-value store 504; see FIG. 5) can also be deleted.

Having updated the attribute corresponding to the owner volume ID in the leaf page of the data page, it may also be necessary to update the SnapOwnedCount and/or the UnsharedWithParentCount of the sequential previous volume in the same branch as the deleted snapshot volume. For example, with regard to the volume family VF1, if the snapshot volume selected for deletion is the volume T2 in the branch B1, then the SnapOwnedCount and the UnsharedWithParentCount of the sequential previous volume T1 in the branch B1 may be updated, as follows. To update the SnapOwnedCount of the volume T1, the storage processing circuitry 110 may determine the number of data pages among a total number of data pages written to the volume T1 that were overwritten in the volume T3 in the branch B1. In one embodiment, such a determination can be made, once the volume T2 has been deleted, by performing a comparison of leaf pages at the leaf level of a mapping hierarchy (e.g., the mapping hierarchy 400; see FIG. 4), taking into account the source ("S") and copy ("C") attributes of the leaf pointers of the respective volumes T1, T3 at the volume level of the mapping hierarchy. To update the UnsharedWithParentCount of the volume T1, the storage processing circuitry 110 may determine the number of data pages among the total number of data pages written to the volume T1 that were overwritten in any sequential next volume T3, T4, T5 in the branch B1. In one embodiment, such a determination can be made by obtaining the sum of (i) the number of data pages overwritten in the volume T3, (ii) the number of data pages overwritten in the volume T4, and (iii) the number of data pages overwritten in the volume T5. It is noted that the key-value pair maintaining the SnapOwnedCount and the UnsharedWithParentCount for the volume T2 can be deleted once the volume T2 has been deleted.

Figure 6:
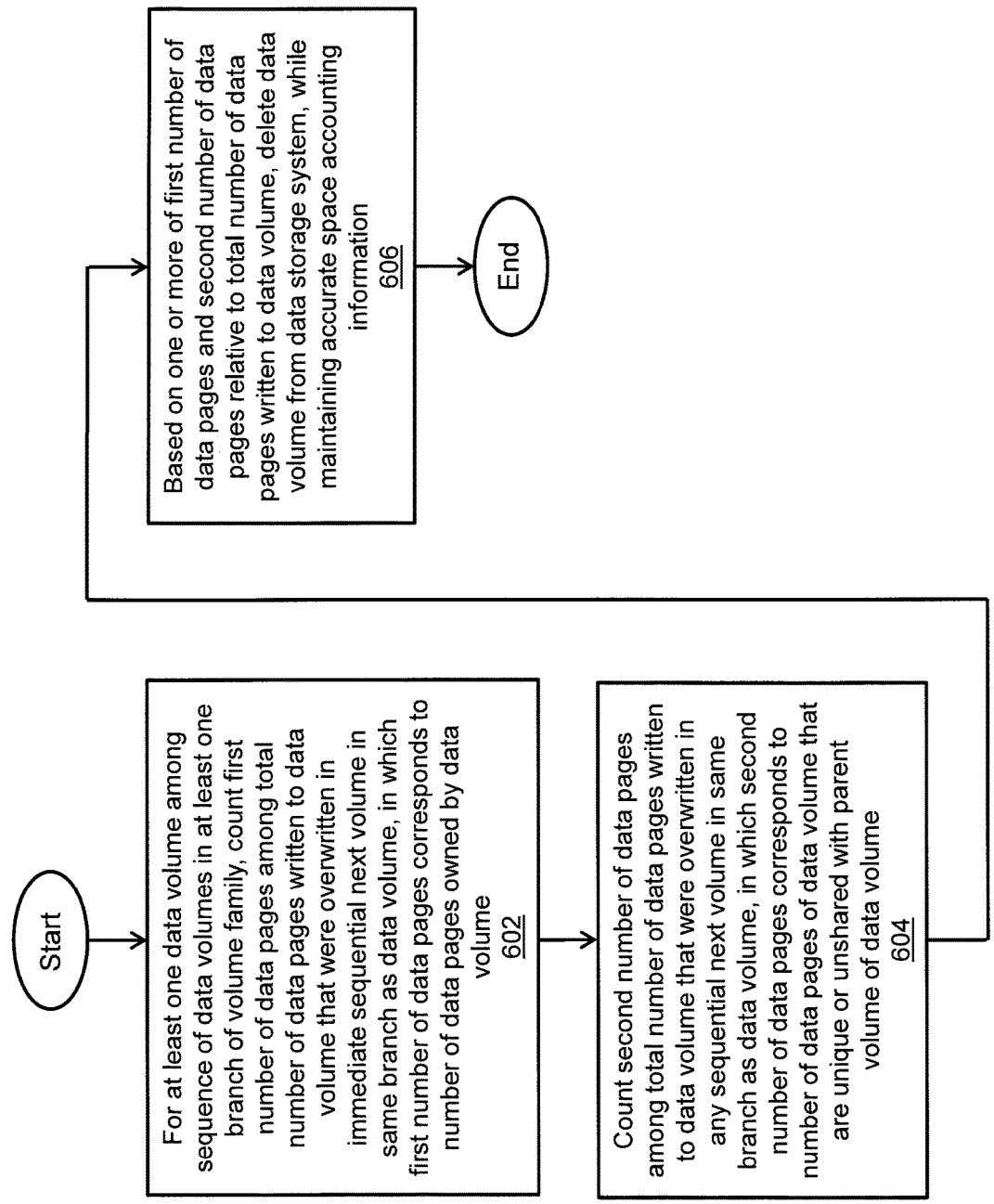
FIG. 6 is a flow diagram of an exemplary method of a data storage system for tracking data pages that are unshared among one or more data volumes and their parent volume(s) in a volume family.

An exemplary method of a data storage system for tracking data pages that are unshared among one or more data volumes and their parent volume in a volume family is described herein with reference to FIG. 6. As depicted in block 602, for at least one data volume among a sequence of data volumes in at least one branch of a volume family, a first number of data pages, among a total number of data pages written to the data volume that were overwritten in an immediate sequential next volume in the same branch as the data volume, are counted, in which the first number of data pages corresponds to a number of data pages owned by the data volume. As depicted in block 604, for the at least one data volume among the sequence of data volumes in the at least one branch of the volume family, a second number of data pages, among the total number of data pages written to the data volume that were overwritten in any sequential next volume in the same branch as the data volume, are counted, in which the second number of data pages corresponds to a number of data pages of the data volume that are unique or unshared with a parent volume of the data volume. As depicted in block 606, based on one or more of the first number of data pages and the second number of data pages relative to the total number of data pages written to the data volume, the data volume is deleted from the data storage system. For example, if the first and second numbers provide indications that the total number of data pages written to the data volume are owned by the data volume and are unique or unshared, then the data volume may be deleted from the data storage system, while maintaining accurate space accounting information.

Having described the foregoing illustrative embodiments, other embodiments and/or variations may be made and/or practiced. For example, it was described herein that a collection of Modes could be organized with associated namespace metadata, including a namespace Mode configured to store a Family ID, a Branch ID, a Branch root volume ID, and a Volume ID for each data volume in a volume family. In one embodiment, the Family ID, the Branch ID, the Branch root volume ID, and the Volume ID for each data volume in the volume family can also be maintained in a lightweight database for efficient snapshot space accounting purposes.

It was further described herein that, with regard to deletion of a snapshot volume in a volume family, it might be necessary to update the UnsharedWithParentCount of a sequential previous volume in the same branch as the deleted snapshot volume. In one embodiment, the UnsharedWithParentCount can be updated without concurrently updating the owner volume ID per data page because (i) there is only one writable volume per branch of the volume family, and therefore the owner volume ID is changing in only one volume's leaf page at any given point in time, regardless of the number of volumes in the branch, (ii) the effective owner volume of each data page can be successfully identified, in accordance with the manner described hereinabove, and (iii) the correct UnsharedWithParentCount of the owner volume can be updated for each data page overwritten in the writable volume, and therefore there is essentially no overlap in the space accounting maintained per volume, and the UnsharedWithParentCount can be effectively relied upon to return the unshared data page count for each snapshot volume with respect to its corresponding writable parent volume.

It was also described herein that the deletion of snapshot volumes could be performed in a data storage system as a background process. In one embodiment, the space accounting associated with such deletion of snapshot volumes can also be performed as a background process to avoid impacting the performance of the data storage system.

It was further described herein that, with regard to a data volume in a volume family, a counter could be maintained for tracking a number (i.e., the UnsharedWithParentCount) of data pages among the total number of data pages written to the data volume that were overwritten in any sequential next volume in the same branch as the data volume. In one embodiment, the UnsharedWithParentCount can be used to report the "unshared" field defined in the VASA 3.0 API guide for VVOLs programming (2016). VASA (vSphere APIs for Storage Awareness) is a virtual machine management tool, available from VMware®, which provides an integration and management framework for external storage such as SAN or NAS-based storage.

While various embodiments of the disclosed systems, apparatus, and methods have been particularly shown and described, it will be understood by those skilled in the art that various changes in form and/or details may be made therein, without departing from the scope of this disclosure.

What is claimed is:

1. A method of a data storage system for tracking data pages that are unshared among one or more data volumes and their parent volume in a volume family, comprising:

for at least one data volume among at least one sequence of data volumes in at least one branch of said volume family, counting a first number of data pages among a total number of data pages written to the at least one data volume that were overwritten in an immediate sequential next volume in same branch as the at least one data volume, the first number of data pages corresponding to a number of data pages owned by the at least one data volume;

for the at least one data volume among the at least one sequence of data volumes in the at least one branch of the volume family, counting a second number of data pages among the total number of data pages written to the at least one data volume that were overwritten in any sequential next volume in same branch as the at least one data volume, the second number of data pages corresponding to a number of data pages of the at least one data volume that are unshared with a parent volume of the at least one data volume; and based on one or more of the first number of data pages and the second number of data pages relative to the total number of data pages written to the at least one data volume, deleting the at least one data volume from the data storage system, while maintaining accurate space accounting information.

2. The method of claim 1 wherein the volume family has an associated family identifier (ID), each branch of the volume family has an associated branch ID, each branch root volume in the volume family has an associated branch root volume ID, and each data volume in the volume family has an associated volume ID, wherein the family ID, the branch ID, the branch root volume ID, and the volume ID for each data volume in the volume family are referred to herein collectively as an IO key, wherein a first branch of the volume family includes a writable volume, and wherein the method further comprises:

receiving a first write request at the data storage system, the first write request requesting that a first data page be written to the writable volume in the first branch of the volume family;

incorporating the IO key associated with the writable volume into the first write request; and forwarding the first write request along a write path to effect writing of the first data page to the writable volume.

3. The method of claim 2 further comprising:

maintaining the family ID, the branch ID, the branch root volume ID, and the volume ID for each data volume in the volume family in a namespace index node (inode) of the data storage system.

4. The method of claim 2 further comprising:

maintaining a mapping hierarchy of the sequence of data volumes in the volume family, the mapping hierarchy including at least a volume level with a plurality of volume nodes corresponding to the sequence of data volumes, respectively, and a leaf level with a plurality of leaf nodes corresponding to a plurality of leaf pages, respectively, each leaf page pointing to a data page of a respective one of the sequence of data volumes.

5. The method of claim 4 wherein each leaf page has an attribute specifying an owner volume ID of an owner of the data page pointed to by the leaf page, and wherein the method further comprises:

having written the first data page to the writable volume, setting an owner volume ID in a leaf page of the mapping hierarchy pointing to the first data page to a current latest volume ID of the writable volume.

6. The method of claim 5 further comprising:

creating a snapshot volume in the first branch of the volume family based on the writable volume;

assigning the current latest volume ID to the snapshot volume; and assigning a new latest volume ID to the writable volume.

7. The method of claim 6 further comprising:

having created the snapshot volume in the first branch of the volume family, setting the owner volume ID in the leaf page of the mapping hierarchy pointing to the first data page to the new latest volume ID of the writable volume.

8. The method of claim 7 further comprising:

receiving a second write request at the data storage system, the second write request requesting that the first data page written to the writable volume be overwritten with new data;

incorporating the IO key associated with the writable volume into the second write request; and forwarding the second write request along the write path to effect overwriting of the first data page with the new data.

9. The method of claim 8 further comprising:

having overwritten the first data page with the new data:
setting an owner volume ID in a leaf page of the mapping hierarchy pointing to an overwritten version of the first data page to the new latest volume ID of the writable volume; and maintaining the current latest volume ID of the snapshot volume in the leaf page of the mapping hierarchy pointing to an original version of the first data page.

10. The method of claim 9 further comprising:

for the writable volume, incrementing a count of the first number of data pages corresponding to the number of data pages owned by the writable volume.

11. The method of claim 10 further comprising:
for the snapshot volume:
incrementing a count of the first number of data pages corresponding to the number of data pages owned by the snapshot volume; and
incrementing a count of the second number of data pages corresponding to the number of data pages of the snapshot volume that are unshared with the writable volume.

12. The method of claim 11 further comprising:
maintaining, for each of the writable volume and the snapshot volume, the count of the first number of data pages and the count of the second number of data pages in a key-value store.

13. The method of claim 12 wherein the maintaining of the count of the first number of data pages and the count of the second number of data pages in the key-value store includes maintaining a key-value pair in the key-value store for each of the writable volume and the snapshot volume, the key-value pair for the writable volume including a first key corresponding to the family ID, the branch ID, and the volume ID for the writable volume, and a first value corresponding to the count of the first number of data pages and the count of the second number of data pages for the writable volume, the key-value pair for the snapshot volume including a second key corresponding to the family ID, the branch ID, and the volume ID for the snapshot volume, and a second value corresponding to the count of the first number of data pages and the count of the second number of data pages for the snapshot volume.

14. A data storage system, comprising:
at least one storage device configured to store at least one sequence of data volumes;
a memory configured to store executable instructions; and
storage processing circuitry configured to execute the executable instructions out of the memory:
for at least one data volume among the at least one sequence of data volumes in at least one branch of a volume family, to count a first number of data pages among a total number of data pages written to the at least one data volume that were overwritten in an immediate sequential next volume in same branch as the at least one data volume, the first number of data pages corresponding to a number of data pages owned by the at least one data volume;
for the at least one data volume among the at least one sequence of data volumes in the at least one branch of the volume family, to count a second number of data pages among the total number of data pages written to the at least one data volume that were overwritten in any sequential next volume in same branch as the at least one data volume, the second number of data pages corresponding to a number of data pages of the at least one data volume that are unshared with a parent volume of the at least one data volume; and
based on one or more of the first number of data pages and the second number of data pages relative to the total number of data pages written to the at least one data volume, to delete the at least one data volume from the at least one storage device, while maintaining accurate space accounting information.

15. A computer program product including a set of non-transitory, computer-readable media having instructions that, when executed by control circuitry of a computerized apparatus, cause the control circuitry to perform a method of a data storage system for tracking data pages that are unshared among one or more data volumes and their parent volume in a volume family, the method comprising:
for at least one data volume among at least one sequence of data volumes in at least one branch of said volume family, counting a first number of data pages among a total number of data pages written to the at least one data volume that were overwritten in an immediate sequential next volume in same branch as the at least one data volume, the first number of data pages corresponding to a number of data pages owned by the at least one data volume;
for the at least one data volume among the at least one sequence of data volumes in the at least one branch of the volume family, counting a second number of data pages among the total number of data pages written to the at least one data volume that were overwritten in any sequential next volume in same branch as the at least one data volume, the second number of data pages corresponding to a number of data pages of the at least one data volume that are unshared with a parent volume of the at least one data volume; and
based on one or more of the first number of data pages and the second number of data pages relative to the total number of data pages written to the at least one data volume, deleting the at least one data volume from the data storage system, while maintaining accurate space accounting information.

16. The computer program product of claim 15 wherein the volume family has an associated family identifier (ID), each branch of the volume family has an associated branch ID, each branch root volume in the volume family has an associated branch root volume ID, and each data volume in the volume family has an associated volume ID, wherein the family ID, the branch ID, the branch root volume ID, and the volume ID for each data volume in the volume family are referred to herein collectively as an IO key, wherein a first branch of the volume family includes a writable volume, and wherein the method further comprises:
receiving a first write request at the data storage system, the first write request requesting that a first data page be written to the writable volume in the first branch of the volume family;
incorporating the IO key associated with the writable volume into the first write request; and
forwarding the first write request along a write path to effect writing of the first data page to the writable volume.

17. The computer program product of claim 16 wherein the method further comprises:
maintaining a mapping hierarchy of the sequence of data volumes in the volume family, the mapping hierarchy including at least a volume level with a plurality of volume nodes corresponding to the sequence of data volumes, respectively, and a leaf level with a plurality of leaf nodes corresponding to a plurality of leaf pages, respectively, each leaf page pointing to a data page of a respective one of the sequence of data volumes.

18. The computer program product of claim 17 wherein each leaf page has an attribute specifying an owner volume ID of an owner of the data page pointed to by the leaf page, and wherein the method further comprises:
having written the first data page to the writable volume, setting an owner volume ID in a leaf page of the mapping hierarchy pointing to the first data page to a current latest volume ID of the writable volume.

19. The computer program product of claim 18 wherein the method further comprises:

creating a snapshot volume in the first branch of the volume family based on the writable volume;

assigning the current latest volume ID to the snapshot volume;

assigning a new latest volume ID to the writable volume; and having created the snapshot volume in the first branch of the volume family, setting the owner volume ID in the leaf page of the mapping hierarchy pointing to the first data page to the new latest volume ID of the writable volume.

20. The computer program product of claim 19 further comprising:

receiving a second write request at the data storage system, the second write request requesting that the first data page written to the writable volume be overwritten with new data;

incorporating the IO key associated with the writable volume into the second write request;

forwarding the second write request along the write path to effect overwriting of the first data page with the new data;

having overwritten the first data page with the new data:
setting an owner volume ID in a leaf page of the mapping hierarchy pointing to an overwritten version of the first data page to the new latest volume ID of the writable volume; and maintaining the current latest volume ID of the snapshot volume in the leaf page of the mapping hierarchy pointing to an original version of the first data page;

for the writable volume, incrementing a count of the first number of data pages corresponding to the number of data pages owned by the writable volume; and for the snapshot volume:
incrementing a count of the first number of data pages corresponding to the number of data pages owned by the snapshot volume; and incrementing a count of the second number of data pages corresponding to the number of data pages of the snapshot volume that are unshared with the writable volume.

* * * * *